Patented Jan. 26, 1943

2,309,188

UNITED STATES PATENT OFFICE 2,309,188

TREATMENT OF HIDES

John Marshall Grim and William O. Dawson, Stamford, Conn., assignors to American Cyanamid Company, New York, N. Y., a corporation of Maine No Drawing. Application October 14, 1941, Serial No. 414,939

2 Claims. (Cl. 149—5)

This invention relates to the treatment of hides and more particularly to a process for white tanning of hides and to the products obtainable thereby.

According to the present invention, white tanned leathers may be obtained by treating hides with an aqueous solution of a hydrophile condensation product of ammeline and formaldehyde. Processes for the preparation of these condensation products and certain of the same are described in the application of J. M. Grim, Serial No. 376,850, filed January 31, 1941.

As described in application Serial No. 376,850, these materials, which constitute the synthetic tanning agents of the present process, are condensation products of 1 mol of ammeline and about 3–4 mols of formaldehyde partially neutralized with borax. Broadly stated, these hydrophile condensation products may be prepared by condensing ammeline and formaldehyde in the proportions indicated and reacting the resulting acidic condensation product with borax $(Na_2B_4O_7.10H_2O)$ in quantities sufficient to produce a water-dilutable product, or alternatively, the required amount of borax may be added to the original reaction mixture of ammeline and formaldehyde and the whole then heated to condensation. The amount of borax required is dependent in each case upon the ratio of formaldehyde in the condensation product; the higher this ratio, the less borax needed. In general, based on the weight of the ammeline entering into reaction with the formaldehyde, about 30% of borax is required for solubilizing the ammeline-formaldehyde condensation products.

In the preferred method of preparing the water-soluble condensation products, the borax is added to the hot reaction mixture after formation of the condensation product of the ammeline and formaldehyde. In either the preferred or alternative procedures, the mixture of ammeline and formaldehyde is heated under reflux for about ten, but not more than about fifteen, minutes.

The preferred method of preparing the hydrophile condensation products in which the borax is added to the hot reaction mixture after the condensation is illustrated by the following specific examples in which the parts are by weight.

Example 1

31.8 parts (0.25 mol) of finely ground ammeline (100 mesh) and 60.5 parts (0.75) mol of 37% formalin were refluxed for ten minutes when the solution was practically clear. The borax was added with stirring to the hot syrup and after 12 parts (0.03 mol) of solid borax

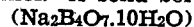

were added, the syrup was completely clear and completely miscible with water. The amount of borax added was about 37.7% on the weight of the ammeline. The syrup had a pH of about 7.5. The diluted product was quite readily converted to the hydrophobic state on the addition of acetic acid. The syrup changed to a water-soluble gel on standing.

Example 2

127 parts (1 mol) of ammeline and 324 parts (4 mols) of 37% formalin were refluxed to a clear syrup in about ten minutes. 40 parts (0.105 mol) of borax $(Na_2B_4O_7.10H_2O)$ and 45 parts of water were added to the hot syrup with stirring. The resulting syrup had a pH of about 6.5, a solid resin content of about 49.8%, was water-soluble and convertible to the hydrophobe state on the addition of acid. The amount of borax added was about 31.5% on the weight of the ammeline.

The alternative method of preparing the hydrophile condensation products in which the borax, in a minimum of about 31% on the weight of the ammeline employed, is added to the original mixture of reactants and the whole then heated to condensation is illustrated by the following specific examples, the parts being by weight.

Example 3

A mixture of 31.8 parts (0.25 mol) of ammeline and 60.5 parts (0.75 mol) of 37% formalin to which has been added 10 parts (0.26 mol) of solid borax $(Na_2B_4O_7.10H_2O)$ was refluxed in ten minutes to a clear syrup which on cooling had a pH of about 6.4. The syrup, which had a solid resin content of about 58.7%, was completely water-soluble and very sensitive to acid, being converted therewith to the hydrophobe state. The amount of borax added was about 31.4% on the weight of the ammeline.

Example 4

A mixture of 64 parts of ammeline (½ mol) and 162 parts of 37% formalin (2 mols) to which had been added 20 parts (0.052 mol) of solid borax $(Na_2B_4O_7.10H_2O)$ wes refluxed (with stirring) for ten minutes and then cooled. The resulting syrup of pH 6.5 had a solid resin content of about 54.8%, was dilutable with water and in the diluted condition readily converted to the hydrophobe state on adding acid. It changed to a water-dilutable gel after standing several hours. The amount of borax employed was about 31.25% on the weight of the ammeline.

Where in the preparation of the hydrophile condensation products a ratio of 3 mols of formaldehyde to each mol of ammeline is employed, it is preferable to add a quantity of water, for example, about 50% on the combined weight of the ammeline and formalin initially employed, to the hydrophile syrup after the condensation and before it cools to insure the formation of a softer gel on standing of the syrup.

The hydrophile ammeline-formaldehyde condensation products constituting the synthetic tanning agents of the process of the present invention have the properties of being acid-sensitive and dilutable with water within a wide range without precipitation of the solid form of the condensation product. In the water diluted condition, they may be converted to the hydrophobe state by the addition of acid, with precipitation of a white solid resin. These properties of the hydrophile condensation products are employed by the process of the present invention for the white tanning of hides.

The application of the hydrophile ammeline-formaldehyde condensation products to the white tanning of hides is illustrated by the following specific example, to which, however, the invention is not to be limited, and in which the parts are by weight.

*Example 5*

20 parts of pickled kid skin, 20 parts of a 15% sodium chloride solution and 4 parts of the resin syrup of Example 4 were drummed overnight, and the treated skins washed and dried. White, full and well-tanned skins were obtained.

The drumming time may be varied and, in general, will depend upon the time required for exhaustion of the condensation product from the tanning bath.

If desired, acid in dilute solution may be employed to aid in the precipitation and hardening of the deposited solid condensation products. The hide may be pretreated with the acid, drained and then drummed with a solution of one of the condensation products. The acid may also be added to the tanning bath, but in such cases it is preferably added after the hide has been drummed with the solution of the condensation product for a substantial length of time, i. e., at a point where further precipitation of the solid condensation product proceeds at a slow rate. The amount of acid added in each case will depend on the alkalinity of the condensation products and on the acidity of the hide, as will be apparent to one skilled in the art of tanning.

Where pickled skins of high acidity are to be tanned by the present process, it may be desirable to reduce the acidity of the skins before subjecting them to action of the condensation products, as will be understood by one skilled in the art.

The white tanned skins obtainable by the process of the present invention may be further tanned by suitable processes, e. g., formaldehyde or alum tanning.

In place of condensation products partially neutralized with borax, there may be employed condensation products of 1 mol of ammeline and about 3-4 mols of formaldehyde solubilized by partial neutralization with a base having a dissociation constant of at least $1 \times 10^{-7}$ or with a salt of a strong base and a weak acid having an equal active alkalinity which bases and salts do not condense with formaldehyde or exert an undesirable effect on the raw hide, e. g., solubilizing or excessive swelling of the hide. Among the bases and salts which may be so employed are sodium and potassium hydroxides, trisodium phosphate, tetrasodium pyrophosphate, trimethylamine, triethylamine, and sodium maleate. Further examples are sodium carbonate and bicarbonate, which are less suitable because of evolution of the carbon dioxide gas attending their use. However, with careful addition thereof to the condensation product and with adequate venting, frothing and pressure difficulties may be minimized.

In the production of the water-dilutable condensation products, the bases and salts of more active alkalinity are to be employed for solubilizing the condensation products of lower formaldehyde ratio, e. g., 3 mols, because of the greater water-insolubility of the latter. The higher the ratio of formaldehyde combined with the ammeline, the more nearly water-soluble is the condensation product itself. Thus, trimethylamine and triethylamine are not suitable for the production of a soluble resin where the condensation product contains 3 mols of combined formaldehyde, but may be used for the preparation of the soluble condensation products of 1 mol of ammeline and 4 mols of formaldehyde.

Since suitable variations and changes may be made in the invention without departing from the spirit and scope thereof, the foregoing description is intended by way of illustration except as defined in the appended claims.

We claim:

1. A process of tanning hides which comprises treating the hide with an aqueous solution of a water-dilutable, acid-sensitive condensation product of one mol of ammeline and about 3-4 mols of formaldehyde partially neutralized with borax.

2. White tanned hide having incorporated therein the solid condensation product of one mol of ammeline and about 3-4 mols of formaldehyde, said product being obtainable by the process of claim 1.

JOHN MARSHALL GRIM.
WILLIAM O. DAWSON.